United States Patent
Brabec et al.

(10) Patent No.: US 10,571,580 B2
(45) Date of Patent: Feb. 25, 2020

(54) DETECTOR ELEMENT FOR DETECTING INCIDENT X-RAY RADIATION

(71) Applicant: Siemens Healthcare GmbH, Erlangen (DE)

(72) Inventors: Christoph Brabec, Nuremberg (DE); Gebhard Matt, Erlangen (DE); Moses Richter, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 33 days.

(21) Appl. No.: 15/774,652

(22) PCT Filed: Oct. 7, 2016

(86) PCT No.: PCT/EP2016/074007
§ 371 (c)(1),
(2) Date: May 9, 2018

(87) PCT Pub. No.: WO2017/080728
PCT Pub. Date: May 18, 2017

(65) Prior Publication Data
US 2018/0329080 A1   Nov. 15, 2018

(30) Foreign Application Priority Data
Nov. 11, 2015 (DE) .................. 10 2015 222 268

(51) Int. Cl.
*G01T 1/20* (2006.01)
*G01T 1/202* (2006.01)
*G21K 4/00* (2006.01)

(52) U.S. Cl.
CPC ............ *G01T 1/2018* (2013.01); *G01T 1/202* (2013.01); *G01T 1/20* (2013.01); *G21K 4/00* (2013.01)

(58) Field of Classification Search
CPC .......... G21K 2004/04; G21K 2004/06; G01T 1/2018; G01T 1/20; G01T 1/242; G01T 1/2012
(Continued)

(56) References Cited

U.S. PATENT DOCUMENTS

| 4,704,635 A * | 11/1987 | Nudelman .............. H01J 31/28 313/366 |
| 7,180,075 B2 | 2/2007 | Brabec et al. |

(Continued)

FOREIGN PATENT DOCUMENTS

| DE | 102008013413 A1 | 10/2009 | |
| DE | 102012206180 A1 * | 10/2013 | ........... G01T 1/2018 |

(Continued)

OTHER PUBLICATIONS

International Search Report PCT/ISA/210 for International Application No. PCT/EP2016/074007 dated Jan. 4, 2017.
(Continued)

*Primary Examiner* — Taeho Jo
(74) *Attorney, Agent, or Firm* — Harness, Dickey & Pierce, P.L.C.

(57) ABSTRACT

A detector element is for detecting incident x-ray radiation. The detector element includes a scintillation layer for converting the x-ray radiation into scintillation light and a photoactive element for converting the scintillation light into an electric signal. The photoactive element includes a first photoactive absorption layer contacted by an electrode, and a second photoactive absorption layer contacted by a counter electrode. Here, the scintillation layer is arranged between the first photoactive absorption layer and the second photoactive absorption layer.

18 Claims, 2 Drawing Sheets

(58) Field of Classification Search
USPC .................................................. 250/361 R
See application file for complete search history.

(56) References Cited

U.S. PATENT DOCUMENTS

| | | | |
|---|---|---|---|
| 7,608,829 B2 | 10/2009 | Loureiro et al. | |
| 2001/0008271 A1 | 7/2001 | Ikeda et al. | |
| 2002/0079455 A1* | 6/2002 | Wieczorek | G01T 1/2018 250/367 |
| 2004/0113088 A1* | 6/2004 | Brabec | G01T 1/2018 250/370.11 |
| 2012/0091456 A1* | 4/2012 | Kelley | H01L 23/573 257/49 |
| 2012/0121067 A1* | 5/2012 | Hayden | G01T 1/2018 378/62 |
| 2013/0032723 A1* | 2/2013 | Lee | G01T 1/20 250/369 |
| 2013/0061930 A1* | 3/2013 | Atienzar | H01L 51/0086 136/263 |
| 2013/0082264 A1* | 4/2013 | Couture | G01T 1/2018 257/59 |
| 2013/0119260 A1* | 5/2013 | Nakatsugawa | A61B 6/4208 250/366 |
| 2013/0126743 A1* | 5/2013 | Iwakiri | A61B 6/4216 250/366 |
| 2014/0014846 A1* | 1/2014 | Kaneko | G01T 1/20 250/369 |
| 2014/0353513 A1* | 12/2014 | Partain | G01T 1/2018 250/366 |
| 2016/0018535 A1* | 1/2016 | Lee | H01L 27/1461 250/361 R |
| 2016/0313452 A1* | 10/2016 | Hartmann | G01T 1/16 |
| 2016/0320494 A1* | 11/2016 | Hartmann | G01T 1/20 |
| 2017/0115405 A1* | 4/2017 | Biele | G01T 1/24 |
| 2017/0184730 A1* | 6/2017 | Zygmanski | G01T 1/28 |
| 2017/0322323 A1* | 11/2017 | Fischer | G01T 1/2006 |

FOREIGN PATENT DOCUMENTS

| | | |
|---|---|---|
| DE | 102012206180 A1 | 10/2013 |
| DE | 102014212424 A1 | 6/2015 |
| EP | 1209488 A2 | 5/2002 |
| WO | WO-2007137907 A1 | 12/2007 |
| WO | WO-2011018287 A2 | 2/2011 |
| WO | WO 2012062625 A2 | 5/2012 |
| WO | WO 2015158646 A1 | 10/2015 |

OTHER PUBLICATIONS

Written Opinion of the International Searching Authority PCT/ISA/237 for International Application No. PCT/EP2016/074007 dated Jan. 4, 2017.

Tedde, Sandro F. et al. : "Fully Spray Coated Organic Photodiodes", in: Nano Lett., 2009, vol. 9, No. 3, pp. 980-983; DOI: 10.1021/nl803386y; Publication Date (Web): Feb. 24, 2009; Downloaded from http://pubs.acs.org on Apr. 23, 2009.

Arca, Francesco et al. "Large Active Area Organic Photodiodes for Short-Pulse X-ray Detection" IEEE Transactions on Electron Devices, vol. 60, No. 5, pp. 1663-1667, 2013.

* cited by examiner

DETECTOR ELEMENT FOR DETECTING INCIDENT X-RAY RADIATION

PRIORITY STATEMENT

This application is the national phase under 35 U.S.C. § 371 of PCT International Application No. PCT/EP2016/074007 which has an International filing date of Oct. 7, 2016, which designated the United States of America and which claims priority to German patent application number DE 10 2015 222 268.3 filed Nov. 11, 2015, the entire contents of which are hereby incorporated herein by reference.

FIELD

An embodiment of the invention generally relates to a detector element for detecting incident x-ray radiation, the detector element including a scintillation layer for converting the x-ray radiation into scintillation light and a photoactive element for converting the scintillation light into an electrical signal.

BACKGROUND

Imaging x-ray detectors are employed for the spatially resolved detection of x-ray radiation in materials analysis, in security checks and quality assurance inspections, as well as in the medical technology field. An x-ray detector of the type typically comprises a number of pixel-like detector elements which are arranged for example as a two-dimensional detector array.

There are direct-converting detector elements and indirect-converting detector elements. Whereas a direct-converting detector element converts the impinging x-ray radiation directly into an electrical signal, in the case of an indirect-converting detector element the x-ray radiation is initially converted into low-energy (in comparison with x-ray radiation) electromagnetic radiation in the visible, infrared or ultraviolet spectral range (light). For this purpose, an indirect-converting detector element comprises a layer composed of scintillating material which absorbs incident x-ray beams and emits (scintillation) light. The scintillation light is detected by means of a photoactive element, such as a photodiode, for example, and converted into an electrical signal.

Organic photodiodes are used increasingly as photoactive elements owing to the fact that the organic semiconductor materials utilized for this purpose absorb the scintillation light better than inorganic semiconductor materials. An organic photodiode of the aforesaid type typically comprises a photoactive organic absorption layer which is arranged between an electrode and a counter electrode.

WO 2012/062625 A2 discloses a hybrid structure for a detector element in which the scintillation layer and the photoactive layer are combined to form a common hybrid layer. The hybrid layer arranged between an electrode and a counter electrode is formed from a photoactive absorption layer composed of organic semiconductor material in which a plurality of scintillator particles are embedded. However, experience shows that in order to achieve an adequate degree of x-ray absorption, the hybrid layer of such detector elements must have a minimum thickness of typically about 100 μm.

SUMMARY

The inventors have discovered that such a thick absorption layer proves problematic in organic semiconductor materials due to the typically low charge carrier mobility, especially because in general the charge carriers as a result can only be extracted effectively in the boundary regions of the absorption layer. This causes depletion zones to develop during the operation of detector elements of the type, which depletion zones at least partially shield off the electrical field between the electrode and the counter electrode. The response time of the photoactive element deteriorates proportionately, which has a disadvantageous impact on the competitiveness of hybrid detector elements of the type in comparison with conventional (inorganic) detector elements.

At least one embodiment of the invention discloses a detector element that is particularly suitable for detecting x-ray radiation. A corresponding x-ray detector is to be disclosed in addition. A further embodiment of the invention discloses a method for producing a detector element of the type.

Embodiments of the invention are directed to a detector element, an x-ray detector, and a method for producing a detector element of the type. Advantageous embodiments and developments are set forth in the claims and the following description.

The detector element according to at least one embodiment of the invention comprises a scintillation layer for converting incident x-ray radiation into scintillation light (i.e. into low-energy electromagnetic radiation in the visible, infrared or ultraviolet spectral range). The detector element further comprises a photoactive element for converting the scintillation light into an electrical signal. The photoactive element has a first photoactive absorption layer contacted by an electrode, and a second photoactive absorption layer contacted by a counter electrode. The scintillation layer is in this case arranged between the first photoactive absorption layer and the second photoactive absorption layer.

The x-ray detector according to at least one embodiment of the invention comprises a plurality of detector elements of at least one embodiment of the invention.

In order to produce the detector element according to an embodiment, a method is provided. According to at least one embodiment of the method, the scintillation layer is produced from a liquid dispersion or suspension of scintillator particles and a polymer material. This enables the scintillation layer to be processed out from the liquid dispersion and thereafter dried or cured (hardened).

A method according to an embodiment of the invention is for producing a detector element of at least one embodiment, in which the scintillation layer is produced from a liquid dispersion of scintillator particles and a polymer material, and in which the photoactive absorption layers are deposited out of a solution directly onto opposite plane faces of the scintillation layer.

BRIEF DESCRIPTION OF THE DRAWINGS

Example embodiments of the invention are explained hereinbelow with reference to a drawing, in which.

Figure 1:
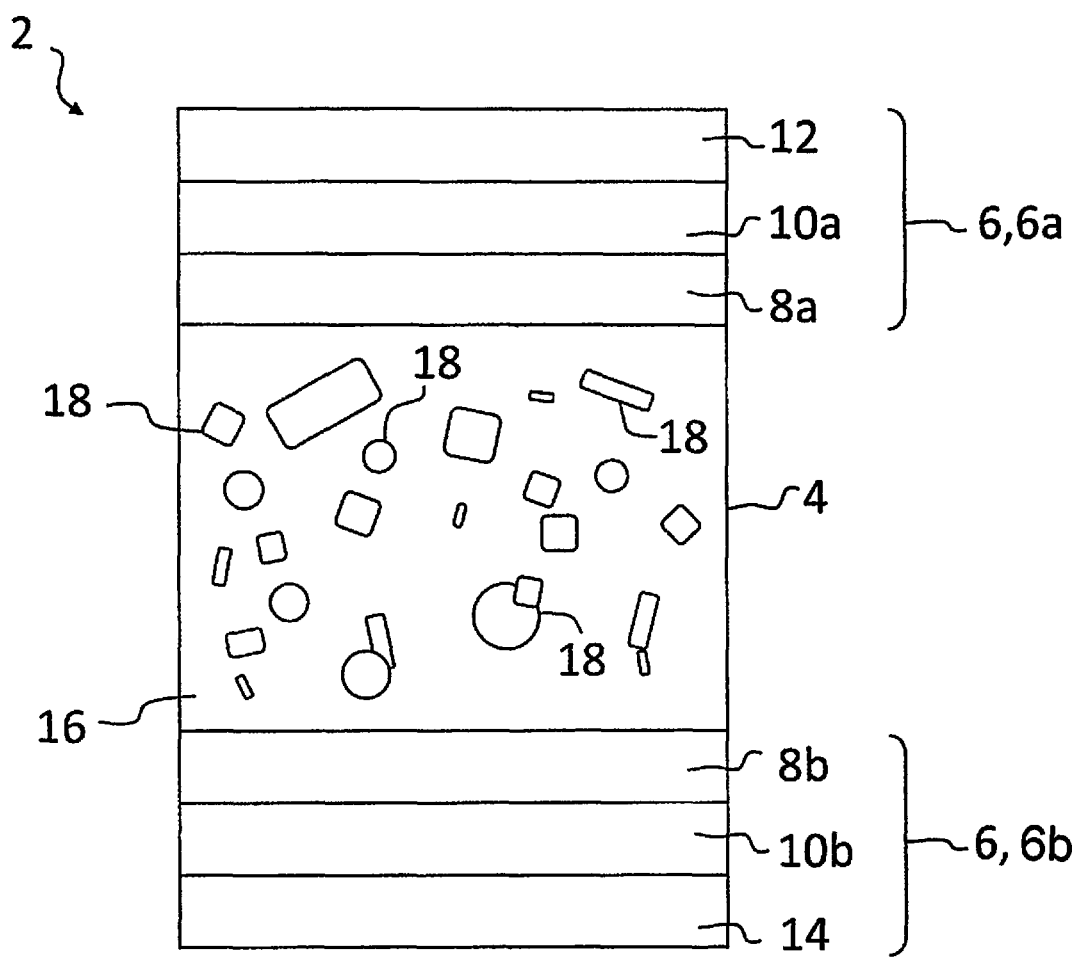
FIG. 1 shows, in a schematic sectional view, a detector element assembled in a layer-like structure for detecting incident x-ray radiation.

In the figures, parts and sizes corresponding to one another are consistently labeled with the same reference signs.

DETAILED DESCRIPTION OF THE EXAMPLE EMBODIMENTS

The detector element according to at least one embodiment of the invention comprises a scintillation layer for converting incident x-ray radiation into scintillation light (i.e. into low-energy electromagnetic radiation in the visible, infrared or ultraviolet spectral range). The detector element further comprises a photoactive element for converting the scintillation light into an electrical signal. The photoactive element has a first photoactive absorption layer contacted by an electrode, and a second photoactive absorption layer contacted by a counter electrode. The scintillation layer is in this case arranged between the first photoactive absorption layer and the second photoactive absorption layer.

The sandwich-like arrangement of the scintillation layer between the two absorption layers enables a comparatively thin embodiment of the absorption layers to be realized, as a result of which a particularly good quantum yield and a particularly good signal-to-noise ratio are achieved in the detection of the scintillation light. By arranging the absorption layers on the opposite plane faces of the scintillation layer, a doubling of the detection surface area for the scintillation light is achieved in this case—in comparison with conventional detector elements having only one photoactive layer—and consequently a doubling of the quantum yield is realized.

A further contributory factor to the improvement in the quantum yield and the signal-to-noise ratio is that small layer thicknesses enable particularly close inspection of the microstructure of the absorption layer in the course of process control, with the result that particularly high-quality surfaces having defined boundary layers can be produced. The thin absorption layers are furthermore favorable to a lower bias or forward voltage between the electrode and the counter electrode during the operation of the detector element, thereby reducing the occurring dark current. In particular, it also becomes possible to operate the detector element in a photovoltaic mode in which no bias or forward voltage is applied. The signal-to-noise ratio of the detector element is improved further as a result.

In a beneficial embodiment, the preferably semiconductor-like absorption layers are adapted in terms of their absorption spectrum to match the emission spectrum of the scintillation layer, i.e. they are selected such that they absorb the scintillation light as completely as possible, electrical charges in the form of electron-hole pairs being created in the process in the absorption layers. During the operation of the detection element, an electrical voltage is usually applied to the electrode and the counter electrode, the electrical voltages accelerating the created electrons and holes toward the electrode and counter electrode, respectively. The electrical (current) signal generated as a result represents a measure for the intensity of the x-ray radiation striking the detector element and is suitable to be used for generating digital image data, for example.

In a particularly preferred embodiment of the invention, at least one of the absorption layers is produced from organic semiconductor material. Within the scope of the invention, the absorption layer is fabricated in particular from a purely organic material. It is, however, equally conceivable within the scope of embodiments of the invention also for at least one of the absorption layers to be embodied as a hybrid layer (i.e. as an absorption layer in which additional scintillator particles are embedded) or as an organometallic perovskite material.

The term perovskite material designates a substance whose chemical structure typically takes the form $ABX_3$, where A is an organic residue or counterion, B is a metal and X is an anion from the group comprising the halogenides iodine, bromine and chlorine. For example, methylammonium lead trihalide ($CH_3NH_3PbX_3$) is employed as a perovskite material, with iodine (I—), bromine (Br—) or chlorine (Cl—) as the halogenide anion X.

The absorption layers are in this case formed in particular from an organic semiconductor material which is also suitable for organic photovoltaics. Organic semiconductors typically have absorption coefficients in the range of $10^5$ or $10^4$ cm$^{-1}$. Thus, even very thin absorption layers which, in the case of the x-ray detector according to embodiments of the invention, lie in the order of magnitude of approx. 300 nm, for example, are adequate for absorbing a sufficient amount of light. Such a layer thickness permits an efficient extraction of charge carriers, even given comparatively low charge carrier mobility.

In order to achieve the best possible signal-to-noise ratio, the x-ray detector provided with such thin absorption layers is preferably operated in the so-called "photovoltaic mode", i.e. without electrical bias voltage, as a result of which a particularly low dark current or leakage current is achieved. Alternatively, however, the x-ray detector may also be operated within the scope of the invention with electrical bias voltage in order to achieve particularly fast signal responses. In this case the absorption layers are preferably embodied as having a greater thickness, in particular having a layer thickness in the range of a few micrometers. The susceptibility to defects in the absorption layer is reduced by this means, since such defects would otherwise allow a strong increase in dark current.

On the other hand, the absorption layers formed from organic semiconductor materials exhibit only an extremely low level of x-ray absorption. The absorption layers are therefore substantially transparent to the incident x-ray radiation, as a result of which the x-ray radiation is able to penetrate virtually unattenuated into the scintillation layer. For the same purpose, the electrode and/or the counter electrode are preferably produced from x-ray transparent material, for example indium tin oxide (ITO), an electrically conductive polymer (e.g. PEDOT-PSS) or very thin metallic contacts (e.g. having layer thicknesses in the range of a few hundred nanometers).

In an advantageous embodiment of the invention, the absorption layers are implemented as bulk heterojunctions (BHJs). By bulk heterojunction is understood a heterogeneous mixture or "blend" between at least one organic acceptor material and at least one organic donor material, in which case boundary layers or heterojunctions are formed between the phases of the acceptor and donor materials within the complete layer volume ("bulk") or at least a large portion of the same. A particularly large (inner) boundary layer between the acceptor and donor materials is provided as a result. The separation of the charge carriers (electron-hole pairs) taking place at the boundary layer is consequently particularly efficient in the absorption layers embodied as BHJ layers, which in turn favors a particularly flat embodiment of the absorption layers.

In an advantageous embodiment of the invention, a first electrically conductive intermediate layer is arranged between the first absorption layer and the electrode, while a second electrically conductive intermediate layer is inserted between the second absorption layer and the counter electrode. The first and the second intermediate layer are in this case in particular selectively electrically conductive for charge carriers of different electrical charge polarity (in particular electrons and holes). The intermediate layers produced in a suitable embodiment from highly doped inorganic semiconductor material are in particular selectively electron-conducting or selectively hole-conducting, and consequently prevent an injection of the respective minority charge carriers from the absorption layers into the electrode or counter electrode. The leakage current (dark current) occurring during the operation of the detector element is reduced as such.

In an advantageous embodiment, the scintillation layer is formed by a matrix which is optically transparent to the scintillation light and in which a plurality of scintillator particles are embedded. On the one hand, a high effective absorption cross-section for the incident x-ray radiation is achieved by way of the scintillator particles. On the other hand, however, the emitted scintillation light is attenuated only to a negligible extent in the scintillation layer, which further promotes the quantum yield of the detector element. In addition, due to the scintillator particles embedded therein, the transparent matrix has numerous scatter centers for the emitted scintillation light. A lateral spreading of the scintillation light within the scintillation layer is inhibited by this. This is advantageous in particular in the case of an x-ray detector having a plurality of adjacently arranged detector elements, since the optical crosstalk between the neighboring detector elements is minimized as a result.

In a beneficial development of at least one embodiment, the matrix has an optical refractive index which is matched to the wavelength of the scintillation light. The refractive indices of the matrix material and of the material of the scintillator particles are in this case aligned as closely as possible with one another. The extraction of the scintillation light from the scintillator particles into the matrix is improved as a result, which is conducive to the sensitivity of the detector element.

In order to match the refractive index of the matrix material to the wavelength of the scintillation light, the matrix material is provided for example with nanoscopic particles from a metal oxide, titanium oxide, for example. What are understood as nanoscopic particles in this context are particles having typical particle diameters in the nanometer range, which are therefore small compared to the wavelength of the emitted scintillation light, and which consequently produce no scattering of the scintillation light. A terbium-doped gadolinium oxysulfide which has an emission maximum in the green spectral range is used for example as the scintillator material. PMMA, an epoxy resin or silicone, for example, is used as the matrix material in this case, because these substances exhibit a comparatively low level of absorption in the cited spectral range. The layer thickness of the scintillation layer is beneficially chosen such that sufficiently good values are yielded both for the x-ray absorption and for the light extraction, as well as, where applicable, for the conductivity of the matrix. Typically, the scintillation layer in this case has a layer thickness in the range of several micrometers.

In a particularly advantageous development, the matrix is electrically conductive in an ambipolar manner. In this development, the detector element with its sandwich-like structure acts like two photodiodes connected in series. By virtue of the electrical conductivity of the matrix, a capacitive charging of the detector element during its operation and a slowdown of the detector response caused thereby is avoided. The matrix material in this case acts as a recombination layer for the non-extracted charge carriers. A permanently efficient extraction of charge carriers during the operation of the detector element is possible as a result, even under continuous bombardment by x-ray radiation.

Alternatively hereto once again, the matrix is embodied as photoconducting. In the unirradiated state, the matrix in this case is electrically insulating, so only a small or even vanishing dark current flows. The matrix material only becomes electrically conductive (preferably in an ambipolar manner) when exposed to x-ray irradiation and thus enables the charge carrier recombination from the two photoactive elements. Furthermore, further charge carriers are generated in the matrix in this process, and under certain conditions these can also contribute to the measured signal of the x-ray detector. Thus, a particularly good signal-to-noise ratio of the x-ray detector is achieved thanks to the photoconducting embodiment of the matrix.

A plurality of detector elements of the above-described type are fixed in a predefined geometric arrangement in relation to one another in order to form the x-ray detector according to an example embodiment of the invention. The individual detector elements or detector pixels are arranged in this case, in particular for the purpose of forming an x-ray detector detecting in a spatially resolved manner in a one-dimensional detector row or a two-dimensional detector array. Within the scope of the x-ray detector, the individual detector elements are preferably coupled to one another for signal processing purposes. In particular, the electrical signals of a plurality of or all the detector elements of the x-ray detector are processed and controlled by a common control or evaluation unit.

The x-ray detector is used for example in the medical technology field, in particular as part of a computed tomography system. Furthermore, such an x-ray detector is also used for example as a radiation monitor, i.e. as a measuring instrument for measuring the x-ray dose rate and therefore the radiation burden for a patient exposed to the x-ray radiation.

The use of the x-ray detector provided with organic absorption layers of the detector pixels as a radiation monitor is particularly advantageous in this instance, since owing to the (in this case x-ray transparent) absorption layers, the radiation burden for the patient can be monitored at a high resolution without unwanted shadowing effects occurring on the actual x-ray image in the process. For the application as radiation monitor, the fill level of the scintillation layer (that is to say, the number and density of the scintillator particles within the matrix) is preferably chosen sufficiently large to ensure that the detector pixels of the radiation monitor reliably generate a sufficiently high and low-noise signal even at a low x-ray dose. Conversely, the fill level is preferably chosen sufficiently small to ensure that no (x-ray) shadows are generated due to the detector elements of the radiation monitor on a downstream-connected imaging detector, and consequently on the x-ray image.

In order to produce the detector element according to an embodiment of the invention, it is provided according to the method that the scintillation layer is produced from a liquid dispersion or suspension of scintillator particles and a polymer material. This enables the scintillation layer to be processed out from the liquid dispersion and thereafter dried or cured (hardened).

In a preferred development of an embodiment of the method, the photoactive absorption layers are deposited out of a solution directly onto opposite plane faces of the scintillation layer. By processing the absorption layers directly out of a solution, a particularly effective and surface-covering optical coupling is ensured between the matrix and the material of the absorption layers.

The detector element 2 shown in FIG. 1 is particularly suited to and equipped for an indirect x-ray detection of incident x-ray radiation. To that end, the detector element 2 comprises a scintillation layer 4 for converting the x-ray radiation into scintillation light having a wavelength in the visible, infrared or ultraviolet spectral range. In addition, the detector element 2 comprises a photoactive element 6 by means of which the scintillation light is subsequently absorbed for conversion into an electrical signal.

The photoactive element 6 is formed by two photodiodes 6a, 6b. One of the two photodiodes 6a, 6b in each case is arranged therein on one of the two plane faces of the scintillation layer 4 for the purpose of detecting the generated scintillation light, with the result that the scintillation layer 4 is accommodated in a sandwich-like manner between the two photodiodes 6a, 6b. Each of the two photodiodes 6a, 6b comprises an absorption layer 8a and 8b, respectively, in which the scintillation light can be absorbed, with electron-hole pairs being formed in the process.

Adjoining each of the absorption layers 8a, 8b on the outside face in each case is an intermediate layer 10a and 10b, respectively, by means of which the respective absorption layer 8a, 8b is coupled in an electrically conductive manner to an electrode 12 and a counter electrode 14, respectively.

The photodiode 6a is accordingly formed from the absorption layer 8a, the intermediate layer 10a and the electrode 12, whereas the photodiode 6b is formed from the absorption layer 8b, the intermediate layer 10b and the counter electrode 14.

The scintillation layer 4 is formed by a matrix 16 composed of a polymer, in which matrix 16 a plurality of scintillator particles 18 are embedded.

The scintillator particles 18 absorb incident x-ray radiation and convert the same into the scintillation light. The matrix 16 is transparent to the incident x-ray radiation as well as to the emitted scintillation light. With regard to the optical refractive index, the matrix 16 is furthermore adapted to match the scintillator particles 18, such that a particularly effective optical extraction of the scintillation light into the matrix 16 is realized.

The matrix 16 is furthermore electrically conducting in an ambipolar manner. In an alternative example embodiment, the matrix 16 is photoconductive. In this case the matrix 16 is electrically conductive only in the presence of scintillation light, whereas it is electrically nonconductive in the absence of scintillation light, and the absorption layers 8a, 8b are therefore insulated from one another.

The scintillator particles 18 preferably have a diameter in the range of the wavelength of the scintillation light. This causes the scintillator particles 18 to act as scatter centers for the scintillation light, as a result of which the lateral transmission of the scintillation light within the scintillation layer 4 is inhibited. The scintillation light is therefore coupled into the photodiodes 6a and 6b primarily via the plane faces of the scintillation layer 4.

The scintillation layer 4 is produced from a liquid dispersion of the scintillator particles 18 and the matrix polymer by drying and curing. The absorption layers 8a, 8b are subsequently deposited out from a liquid directly onto the scintillation layer 4. A particularly effective optical coupling between the scintillation layer 4 and the absorption layers 8a and 8b is achieved as a result.

The absorption layers 8a and 8b are composed of a photoactive organic semiconductor material. The absorption layers 8a and 8b are in this case embodied as bulk heterojunctions.

The intermediate layers 10a, 10b are fabricated from highly doped semiconductor material. The doping of the intermediate layers 10a, 10b is in this case chosen such that the intermediate layer 10a is electrically selectively conductive for electrons, whereas the intermediate layer 10b is electrically selectively conductive for holes. As a result, the absorption layers 8a and 8b are contacted by the electrode and the counter electrode 14, respectively, in a complementary selective manner in relation to the charge polarity.

During the operation of the detector element 2, an electrical voltage is applied between the electrode 12 and the counter electrode 14, the electrode 12 being connected in particular to a positive terminal of a voltage source, and the counter electrode 14 being connected in particular to a negative terminal of the voltage source. Incident x-ray radiation induces the scintillation light within the scintillation layer 4, which scintillation light is absorbed by the absorption layers 8a and 8b, with charge carriers (electron-hole pairs) being formed in the process.

The created charge carriers are separated by the electrical field between the electrode 12 and the counter electrode 14. Owing to the intermediate layers 10a and 10b, electrons are accelerated toward the electrode 12 and holes are accelerated toward the counter electrode 14 and are extracted there. In this case the respective minority charge carriers, i.e. holes in respect of the photodiode 6a and electrons in respect of the photodiode 6b, remain behind in the absorption layers 8a and 8b.

The minority charge carriers can be recombined with one another through charge exchange via the electrically conductive matrix 16. A capacitive charging of the detector element 2 is prevented as a result, thereby enabling a continuous extraction of the charge carriers during exposure to x-ray irradiation.

Figure 2:
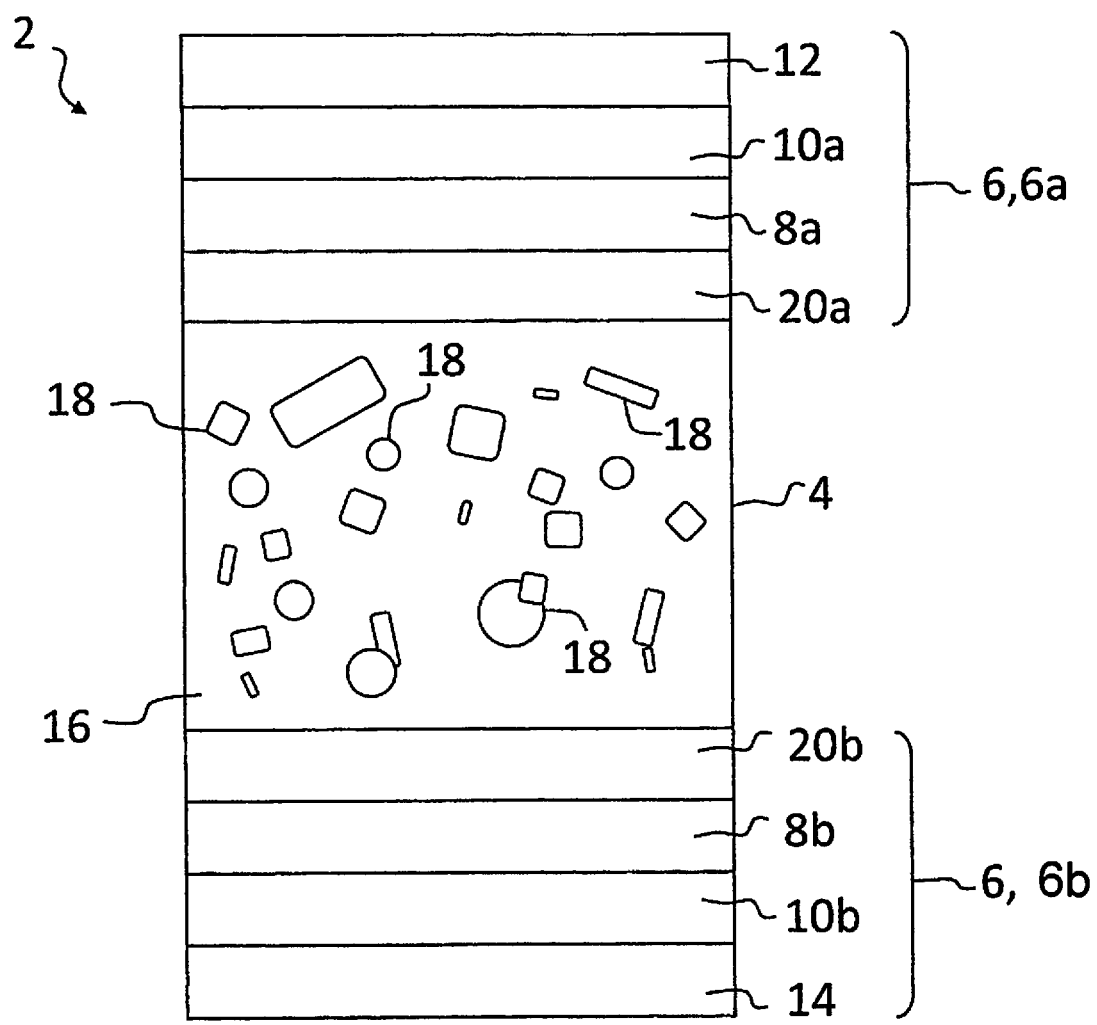
FIG. 2 shows a variant of the detector element in a view according to FIG. 1.

FIG. 2 shows the detector element 2 in a further embodiment variant. In this case, unless described otherwise in the following, the detector element 2 according to FIG. 2 corresponds to the embodiment variant described hereinabove. In contrast to the latter, however, two further intermediate layers 20a and 20b are present, each of which is immediately adjacent to the scintillation layer 4.

The intermediate layer 20a is thus arranged between the scintillation layer 4 and the absorption layer 8a, while the intermediate layer 20b is arranged between the scintillation layer 4 and the absorption layer 8b. The intermediate layers 20a and 20b are semiconductor layers which, in terms of their selective conductivity, are complementary to the respective associated intermediate layers 10a and 10b.

Compared to the embodiment variant according to FIG. 1, the electrical connection to the scintillation layer 4 is improved as a result of the additional intermediate layers 20a, 20b. Furthermore, sites of unevenness at the surface of the scintillation layer 4 are leveled out by the additional intermediate layers 20a, 20b. The mode of operation of the detector element 2 is otherwise not affected by the intermediate layers 20a and 20b, so that in this regard reference is made to the aforementioned embodiments described with reference to FIG. 1.

All of the layers of the detector element 2 according to FIG. 1 or 2 are preferably produced from a solution, suspension or paste, in particular by means of screen printing, doctor blading or a spray coating technique. Care should be taken in this case to ensure that the solvent of the currently produced layer does not disperse or dissolve the layer beneath.

In a beneficial embodiment of the production method, the process is started with a glass substrate that has already been sputtered with a layer composed of ITO acting as the counter electrode 14. On this, the first three layers are applied by means of a doctor blade or slot-die coater, in the following order:

- as intermediate layer 10*b*, a hole-conducting layer composed of PEDOT having a layer thickness between 30 nm and 100 nm,
- as absorption layer 8*b*, a photoactive layer (BHJ) composed of poly(3-hexyl)thiophene (P3HT) and phenyl-C61-butyric acid methyl ester (PCBM) or pure perovskite having a layer thickness between 100 nm and 1000 nm, and
- optionally, as intermediate layer 20*b*, an electron-conducting layer composed of zinc oxide nanoparticles having a layer thickness <50 nm.

The scintillation layer 4 having a layer thickness between 2 μm and 6 μm is deposited on these layers, likewise by doctor blading, for example. The scintillation layer 4 is subsequently dried or cured (preferably by means of a UV-activated curing process). In an alternative method variant, the scintillation layer 4 is laminated on as a finished layer.

The following layers are deposited onto the layer stack, likewise by means of a doctor blade or a slot-die coater:

- optionally, as intermediate layer 20*a*, a hole-conducting layer composed of PEDOT having a layer thickness <50 nm,
- as absorption layer 8*a*, a further photoactive layer composed of P3HT:PCBM having a layer thickness <1000 nm, preferably between 100 nm and 300 nm, and
- as intermediate layer 10*a*, an electron-conducting layer composed of ZnO nanoparticles having a layer thickness <50 nm.

As the final electrode (12), a metal layer (Al or Ag) having a layer thickness of approx. 100 nm is applied by thermal vapor deposition. Alternatively hereto, the electrode (12) is produced from a layer composed of silver nanowires which are deposited out of an ink. A small number of monolayers (in particular approx. 2 to 5) are preferably applied in this case.

The invention is not limited to the example embodiments described in the foregoing. Rather, other variants of the invention may also be derived herefrom by the person skilled in the art without departing from the subject matter of the invention.

The invention claimed is:

1. A detector element to detect incident x-ray radiation, the detector element comprising:
    a scintillation layer to convert the x-ray radiation into scintillation light;
    a photoactive element to convert the scintillation light into an electrical signal, the photoactive element including
        a first photoactive absorption layer contacted by an electrode, and
        a second photoactive absorption layer contacted by a counter electrode,
    wherein the scintillation layer is arranged between the first photoactive absorption layer and the second photoactive absorption layer;
    a first electrically conductive intermediate layer arranged between the first photoactive absorption layer and the electrode; and
    a second electrically conductive intermediate layer arranged between the second photoactive absorption layer and the counter electrode, the first electrically conductive intermediate layer and the second electrically conductive intermediate layer being electrically conductive for charge carriers of different charge polarity,
    wherein the electrode is arranged, with respect to the scintillation layer, on an outside of the first photoactive absorption layer,
    wherein the counter electrode is arranged, with respect to the scintillation layer, on an outside of the second photoactive absorption layer, and
    wherein the scintillation layer is separated from the electrode by the first photoactive absorption layer and the first electrically conductive intermediate layer and the scintillation layer is separated from the counter electrode by the second photoactive absorption layer and the second electrically conductive intermediate layer.

2. The detector element of claim 1, wherein at least one of the first photoactive absorption layer and the second photoactive absorption layer is produced from an organic semiconductor material.

3. The detector element of claim 2, wherein at least one of the first photoactive absorption layer and the second photoactive absorption layer is embodied as a bulk heterojunction.

4. The detector element of claim 2, wherein the scintillation layer is formed by an optically transparent matrix in which a plurality of scintillator particles are embedded.

5. The detector element of claimed in claim 4, wherein the optically transparent matrix includes an optical refractive index matched to a wavelength of the scintillation radiation.

6. An x-ray detector, comprising:
    a plurality of the detector elements of claim 2, at least two of the plurality of the detector elements being fixed in a geometric arrangement in relation to one another.

7. The detector element of claim 1, wherein at least one of the first photoactive absorption layer and the second photoactive absorption layer is embodied as a bulk heterojunction.

8. The detector element of claim 7, wherein the scintillation layer is formed by an optically transparent matrix in which a plurality of scintillator particles are embedded.

9. The detector element of claimed in claim 8, wherein the optically transparent matrix includes an optical refractive index matched to a wavelength of the scintillation radiation.

10. An x-ray detector, comprising:
    a plurality of the detector elements of claim 7, at least two of the plurality of the detector elements being fixed in a geometric arrangement in relation to one another.

11. The detector element of claim 1, wherein the scintillation layer is formed by an optically transparent matrix in which a plurality of scintillator particles are embedded.

12. The detector element of claimed in claim 11, wherein the optically transparent matrix includes an optical refractive index matched to a wavelength of the scintillation radiation.

13. The detector element of claim 12, wherein the optically transparent matrix is electrically conductive in an ambipolar manner.

14. The detector element of claim 11, wherein the optically transparent matrix is electrically conductive in an ambipolar manner.

15. An x-ray detector, comprising:
    a plurality of the detector elements of claim 1, at least two of the plurality of the detector elements being fixed in a geometric arrangement in relation to one another.

16. The detector element of claim 1, wherein the first photoactive absorption layer and the second photoactive absorption layer are each produced from an organic semiconductor material.

17. The detector element of claim 1, wherein at the first photoactive absorption layer and the second photoactive absorption layer are each embodied as a bulk heterojunction.

18. A method for producing a detector element, comprising:
producing a scintillation layer of the detector element from a liquid dispersion of scintillator particles and a polymer material; and
depositing out of a solution, each of a respective first photoactive absorption layer of a photoactive element of the detector element and a respective second photoactive absorption layer of a photoactive element of the detector element, directly onto respective opposite plane faces of the scintillation layer to thereby produce the detector element.

* * * * *